United States Patent
Yoon et al.

(10) Patent No.: US 7,807,288 B2
(45) Date of Patent: Oct. 5, 2010

(54) BATTERY CARTRIDGE-CONNECTING SYSTEM FOR BATTERY MODULE

(75) Inventors: Junill Yoon, Seoul (KR); Jong-yul Ro, Seoul (KR); Do Yang Jung, Hwaseong-si (KR); Jisang Yu, Daejeon (KR)

(73) Assignee: LG Chem, Ltd. (KR)

( * ) Notice: Subject to any disclaimer, the term of this patent is extended or adjusted under 35 U.S.C. 154(b) by 1278 days.

(21) Appl. No.: 11/348,796

(22) Filed: Feb. 6, 2006

(65) Prior Publication Data

US 2006/0214631 A1 Sep. 28, 2006

(30) Foreign Application Priority Data

Feb. 7, 2005 (KR) ...................... 10-2005-0011380

(51) Int. Cl.
*H01M 2/10* (2006.01)
*H01M 2/22* (2006.01)
*H01M 6/42* (2006.01)
*H01R 13/66* (2006.01)
*H02J 7/00* (2006.01)

(52) U.S. Cl. ................. 429/160; 429/163; 429/159; 429/100; 439/620.15; 320/112

(58) Field of Classification Search ........... 429/96–100, 429/159, 160, 163; 320/112; 439/620.15
See application file for complete search history.

(56) References Cited

U.S. PATENT DOCUMENTS

| | | | | |
|---|---|---|---|---|
| 5,912,092 A | * | 6/1999 | Maruyama et al. | 429/96 |
| 6,120,935 A | * | 9/2000 | Van Lerberghe | 429/211 |
| 6,541,154 B2 | * | 4/2003 | Oogami et al. | 429/159 |
| 6,724,170 B1 | * | 4/2004 | Maggert et al. | 320/107 |
| 2002/0090540 A1 | * | 7/2002 | Einhart et al. | 429/32 |
| 2004/0043663 A1 | * | 3/2004 | Ikeda et al. | 439/627 |
| 2004/0224225 A1 | * | 11/2004 | Yamashita et al. | 429/181 |

FOREIGN PATENT DOCUMENTS

KR 10-2006-0072922 6/2006

* cited by examiner

*Primary Examiner*—Jonathan Crepeau
*Assistant Examiner*—Kenneth Douyette
(74) *Attorney, Agent, or Firm*—Cantor Colburn LLP (57) ABSTRACT

A battery cartridge-connecting system for battery modules including bus bars, each of which includes a plate-shaped bar body, coupling parts, and electrical connection parts; a base plate, to which the bus bars are easily mounted; and a printed circuit board (PCB), which is easily coupled to the bus bars and is mounted to the base plate in a compact structure. The present invention also provides a battery module and a medium- or large-sized battery system including the battery cartridge-connecting system.

20 Claims, 11 Drawing Sheets

FIG. 12

BATTERY CARTRIDGE-CONNECTING SYSTEM FOR BATTERY MODULE

FIELD OF THE INVENTION

The present invention relates to a battery cartridge-connecting system for battery modules, and, more particularly, to a battery cartridge-connecting system for battery modules, comprising: bus bars, each of which includes a plate-shaped bar body, coupling parts, and electrical connection parts; a base plate, to which the bus bars are easily mounted; and a printed circuit board (PCB), which is easily coupled to the bus bars and is mounted to the base plate in a compact structure, and a battery module and a medium- or large-sized battery system including the same.

BACKGROUND OF THE INVENTION

Recently, a secondary battery, which can be charged and discharged, has been widely used as an energy source for wireless mobile devices. Also, the secondary battery has attracted considerable attention as a power source for electric vehicles and hybrid electric vehicles, which have been developed to solve problems, such as air pollution, caused by existing gasoline and diesel vehicles using fossil fuel.

Small-sized mobile devices use one or several small-sized cells for each device. On the other hand, medium- or large-sized devices, such as vehicles, use a medium- or large-sized battery system having a plurality of cells electrically connected with each other because high output and large capacity is necessary for the medium- or large-sized devices.

As the unit cell for the medium- or large-sized battery system is widely used a pouch-shaped secondary cell, which is generally packaged in a battery case made of a laminate sheet consisting of aluminum and polymer resin, and therefore, the mechanical strength of the pouch-shaped secondary cell is not high. For this reason, a plurality of unit cells are mounted in a battery cartridge, where the unit cells are connected in series or parallel, and a plurality of battery cartridges are electrically connected with each other to constitute a battery module.

A battery module widely used for hybrid electric vehicles has a closed structure in which an electrolyte cannot leak from each unit cell (secondary cell). That is to say, the closed type battery module has an advantage of preventing leakage of the electrolyte. However, the closed type battery module has problems in that heat generated in unit cells is accumulated, and the accumulated heat accelerates the deterioration of the cells and that a small or large number of unit cells are overheated when they are operated abnormally, and therefore, the unit cells may catch on fire or explode. Lithium-ion secondary cells or lithium-ion polymer secondary cells, which are currently generating much interest in the potential uses of unit cells, generate heat while the secondary cells are charged and discharged. When such heat is continuously accumulated in the unit cell, the deterioration of the unit cell is accelerated, and furthermore, the unit cell may catch on fire or explode.

The applicant of the present application developed a battery cartridge and a battery module having a novel structure to solve the above-mentioned problems, which have been filed to the Korean Intellectual Property Office and accorded Korean Patent Application No. 2004-111699.

The battery cartridge and the battery module described in the above-mentioned patent application, have several features of stably mounting unit cells having low mechanical strength, effectively removing heat from the unit cells, and preventing the unit cells from overheating when the unit cells are operated abnormally, thereby improving the service life and safety of the unit cells. Also, this battery module can be manufactured generally in a compact structure, and therefore, this battery module is preferably used to provide a small-sized high-output, large-capacity battery module or battery system.

On the other hand, it is required that the electrical connection between the unit cells and the coupling of the unit cells with other components be carried out in a small space so as to manufacture the compact battery module or battery system. As a result, it is possible that short circuits occur, and it is difficult to accomplish mechanical coupling by welding or using bolts and nuts. For this reason, there has been proposed a method of accomplishing the electrical connection between the unit cells in a contact fashion using elastic members, such as springs. In this conventional method, however, the mechanical strength and the resistance to vibrations are low, and the elastic members may easily corrode with the result that the contact resistance is increased. Furthermore, the connected parts are easily separated from each other. These problems also occur at a printed circuit board (PCB), which is mounted to measure the voltage and the temperature of the unit cells.

SUMMARY OF THE INVENTION

Therefore, the present invention has been made to solve the above problems, and other technical problems that have yet to be resolved.

Specifically, it is a first object of the present invention to provide a battery cartridge-connecting system that is capable of easily accomplishing the electrical connection and the mechanical coupling in a compact-structured battery module or battery system, the battery cartridge-connection system having excellent electrical characteristics, such as electric resistance at the connected parts, after the electrical connection is completed, and excellent mechanical strength to external impacts or vibrations after the mechanical coupling is completed. The excellent electrical characteristics and the excellent mechanical strength may be also applied to the mounting and the electrical connection of a printed circuit board (PCB), which is provided to electrically connect battery cartridges having unit cells mounted therein and measure the voltage and temperature of the unit cells.

It is a second object of the present invention to provide a battery cartridge-connecting system that is capable of preventing a risk of an engineer or a user being exposed to the electrical short circuits when a battery module or a battery system is manufactured or when the battery module or the battery system is repaired. According to the present invention, the occurrence of short circuits is prevented. Consequently, the defective product rate is lowered, and therefore, the manufacturing efficiency is highly improved.

It is a third object of the present invention to provide a battery module including the above-described battery cartridge-connecting system, whereby the battery module is constructed in a compact structure while the electrical connection is stable and the mechanical characteristics, including durability, are excellent, and a battery system including such a battery module.

In accordance with one aspect of the present invention, the above and other objects can be accomplished by the provision of a battery cartridge-connecting system for battery modules, comprising: bus bars, which are members for electrically connecting battery cartridges, each of the bus bars including a plate-shaped bar body constructed to be in surface contact with electrode terminals of a battery, a coupling part formed by bending at least a portion of each end of the plate-shaped bar body, and electrical connection part formed by bending at least a portion of each end of the plate-shaped bar body, wherein each of the coupling parts is provided with a coupling groove, in which a corresponding coupling member formed at a base plate is engaged, and the electrical connection parts are formed in the shape of a protrusion, which can be securely inserted into a corresponding part of a printed circuit board (PCB); the base plate, which is a member for allowing the plurality of bus bars to be attached thereto, the base plate including a plurality of openings, into which the bus bars are securely inserted, the coupling members being formed at the openings such that the coupling members are engaged in the coupling grooves of the bus bars; and the printed circuit board (PCB), which is a member electrically connected to the plurality of bus bars, the printed circuit board (PCB) having connection holes, through which the protruding electrical connection parts of the bus bars are securely inserted.

With the battery cartridge-connecting system according to the present invention, the plurality of bus bars can be easily mounted to the base plate in a mechanical coupling fashion, and the printed circuit board (PCB) can be electrically connected to the bus bars with ease. Consequently, the mechanical stability at the coupled parts is excellent even though the structure of the battery module or the battery system is compact.

In a preferred embodiment of the present invention, each of the battery cartridges includes a pair of outer frame members (a, b) and an inner frame member (c) disposed between the outer frame members (a, b) such that a unit cell is mounted between the first unit cell between the first outer frame member (a) and the inner frame member (c) and another unit cell is mounted between the second outer frame member (b) and the inner frame member (c). According to circumstances, two or more unit cells are mounted between one of the outer frame members (a or b) and the inner frame member (c).

While the two unit cells are mounted in each of the battery cartridges, the electrode terminals of each unit cell protrude toward the upper ends of the frame members (a, b, c). In a preferred embodiment of the present invention, the inner frame member (c) is provided at a predetermined position corresponding to one of the electrode terminals (the cathode terminal or the anode terminal) of the upper end thereof with a skirt, which extends along the corresponding electrode terminal, and the base plate is provided at a predetermined position corresponding to the skirt with a groove, in which the skirt is engaged. This structure of the skirt and the groove prevents occurrence of electrical short circuits, which may be caused by incorrect connection of the cathode and the anode when the base plate, to which the bus bars are mounted, is assembled with the battery cartridges, and accurately sets the coupling positions of the base plate and the battery cartridges.

Preferably, the electrode terminals of the unit cells mounted in the battery cartridges and the bus bars mounted to the base plate are securely attached to each other by welding or soldering after the assembly of the battery cartridges and the base plate is completed, whereby the coupling and the electrical connection between the electrode terminals and the bus bars are more securely accomplished. More preferably, the electrode terminals of the unit cells and the bus bars are securely attached to each other by welding, such as laser welding or resistance welding.

Preferably, the outer frame members (a, b) are provided at the upper ends thereof with locating parts, at which the electrode terminals of the unit cells are located while being bent, and wherein the outer frame members are provided under the locating parts thereof with depressions, which extend in the lateral direction of the outer frame members, and the locating parts have pluralities of welding grooves, which communicate with the depressions, whereby the welding operation is easily carried out. Consequently, when a welding operation, for example, a resistance welding operation (or a spot welding operation) is carried while the plurality of battery cartridges are stacked, one welding tip is connected to the lower ends of the electrode terminals on the locating parts through the depressions and the welding grooves, and another welding tip is connected to the upper ends of the bus bars. It has been proved that the welding grooves are helpful even when a laser welding operation is carried out at the upper ends of the bus bars.

In a preferred embodiment of the present invention, each of the battery cartridges further has a thermistor for measuring the temperature of the unit cells. The thermistor may be mounted between the unit cells through a groove formed between the anode terminal locating part and the cathode terminal locating part of the inner frame member (c).

The coupling between the frame members is not particularly restricted. For example, the coupling between the frame members may be accomplished by various coupling methods, such as bolts/nuts, rivets, welding, adhesive, a male and female screw coupling member or structure.

Also, the material for the frame members is not particularly restricted. The frame members may be made of various materials, such as plastic resin or metal. In the case of using a conductive material, such as metal, however, it is necessary to electrically insulate the exposed parts of electrode leads.

The unit cells mounted in the cartridges are secondary cells, which can be charged and discharged. Preferably, a rectangular secondary cell or a pouch-shaped secondary cell, which can be stacked with high integration, is used as the unit cell. Preferably, the pouch-shaped cell is normally used as the unit cell.

Each of the unit cells has a cathode, an anode, a separator, and an electrolyte mounted in a sealed cell case. Each of the unit cells has a jelly-roll type structure in which an electrode assembly including a minute porous separator between a thin film-shaped cathode and anode is wound, or a stack type structure in which fullcells or bicells of anode/separator/cathode are sequentially stacked one on another. Active materials, which are applied to the cathode and the anode, are not particularly restricted. Preferably, the cathode active material consists of lithium manganese-based oxide having high safety, and the anode active material consists of carbon. The preferable unit cell is a lithium-ion cell or a lithium-ion polymer cell.

As described above, each of the bus bars includes the plate-shaped bar body, the coupling parts, and the electrical connection parts. The coupling parts and the electrical connection parts are formed by appropriately bending opposite ends of the plate-shaped bar body. Preferably, the coupling parts are bent two times or more such that the coupling parts are elastically engaged in the openings of the base plate with ease when the bus bars are mounted in the openings of the base plate.

The bending direction of the coupling parts is identical to that of the electrical connection parts, and the width of the coupling parts is greater than that of the electrical connection parts, whereby the coupling force between the bus bars and the openings of the base plate is provided by the coupling parts when the bus bars are mounted in the openings of the base plate.

The base plate is attached to the upper ends of the plurality of battery cartridges, which are stacked, i.e., to the electrode terminals, and the base plate includes openings (an upper opening array), in which bus bars interconnecting one-side electrode terminals of the stacked battery cartridges are mounted, and openings (a lower opening array), in which bus bars interconnecting the other-side electrode terminals of the stacked battery cartridges are mounted, the openings of the upper opening array and the openings of the lower opening array being alternately arranged, which will be described hereinafter in detail. As previously described, one of the opening arrays is provided with grooves, in which the skirts of the battery cartridges are engaged, and the other opening array is provided with corresponding skirts.

At the printed circuit board (PCB) is formed a circuit for providing information about the voltage and the temperature of the unit cells to a battery management system (BMS), which includes a circuit for maintaining potential difference between the unit cells at an appropriate level and preventing overcharge, overdischarge, and overcurrent. The circuit of the printed circuit board (PCB) is formed on a plate-shaped material consisting of a denatured epoxy resin composite. The circuit is electrically connected to the respective bus bars. As previously described, the connection holes of the printed circuit board (PCB), through which the electrical connection parts of the bus bars are securely inserted, are formed at predetermined positions corresponding to the bus bars. In a preferred embodiment of the present invention, the connection holes of the printed circuit board (PCB) are formed through protrusions formed at sides of the printed circuit board (PCB). Preferably, the electrical connection parts of the bus bars are inserted through the connection holes of the printed circuit board (PCB), and then the electrical connection parts are securely attached to the printed circuit board (PCB) by soldering. In the case that a thermistor is mounted to each of the battery cartridges, connectors, which are connected to the thermistors, are formed at the printed circuit board (PCB). It goes without saying that the connection holes and the connectors for thermistors are electrically connected to the battery management system (BMS) through the circuit formed on the printed circuit board (PCB).

In accordance with another aspect of the present invention, there is provided A battery module including the above-described battery cartridge-connecting system.

Specifically, the battery module according to the present invention comprises: a battery cartridge assembly including two or more battery cartridges; a box-shaped module case having an open front part, through which the battery cartridge assembly is inserted, and an inner space, in which the battery cartridge assembly is mounted; and a battery cartridge-connecting system coupled to the front open part of the case.

The battery module according to the present invention is generally compact, and the structural stability of the battery module is excellent. The battery module can be manufactured in an open type structure in which heat generated from unit cells while the unit cells are charge and discharged is effectively removed even though the battery module has the compact structure. The details of the battery module manufactured in the open type structure are described in Korean Patent Application No. 2004-111699, the disclosure of which is incorporated herein by reference.

The plurality of battery cartridges are inserted into the module case, the battery cartridge-connecting system (the base plate having the bus bars and the printed circuit board (PCB) mounted thereto) is coupled to the open front part of the module case, and the electrode terminals of the battery cartridges and bus bars are securely attached to each other by welding.

In a preferred embodiment of the present invention, the battery module further comprises: a safety plate for covering the outer surface of the base plate, the safety plate having a plurality of inserting parts, which have a size and a shape suitable to be inserted into the openings of the base plate. The inserting parts of the safety plate serve to improve the tight contact between the bus bars and the electrode terminals of the battery cartridges, to prevent the separation of the bus bars when external impacts are applied to the battery module, and prevent the possibility of short circuits.

After the assembly process is completed, the bus bars are partially exposed from the outer surface of the base plate. Preferably, an additional safety plate for covering the outer surface of the base plate may be further provided.

In accordance with yet another aspect of the present invention, there is provided a high-output, large-capacity battery system (or battery pack) including a plurality of battery modules electrically connected with each other. Preferably, a coupling member for accomplishing effective coupling between the battery modules may be further included.

The battery system according to the present invention may be used for high-output, large-capacity battery systems. Preferably, the battery system is used for battery systems of electric vehicles or hybrid electric vehicles. More preferably, the battery system is used for battery systems of hybrid electric vehicles.

BRIEF DESCRIPTION OF THE DRAWINGS

The above and other objects, features and other advantages of the present invention will be more clearly understood from the following detailed description taken in conjunction with the accompanying drawings, in which.

| <Description of Main Reference Numerals of the Drawings> | |
|---|---|
| 100: battery cartridge | 200: unit cell |
| 300: bus bar | 400: base plate |
| 500: PCB | 600: module case |
| 700: safety plate | 800: battery module |

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
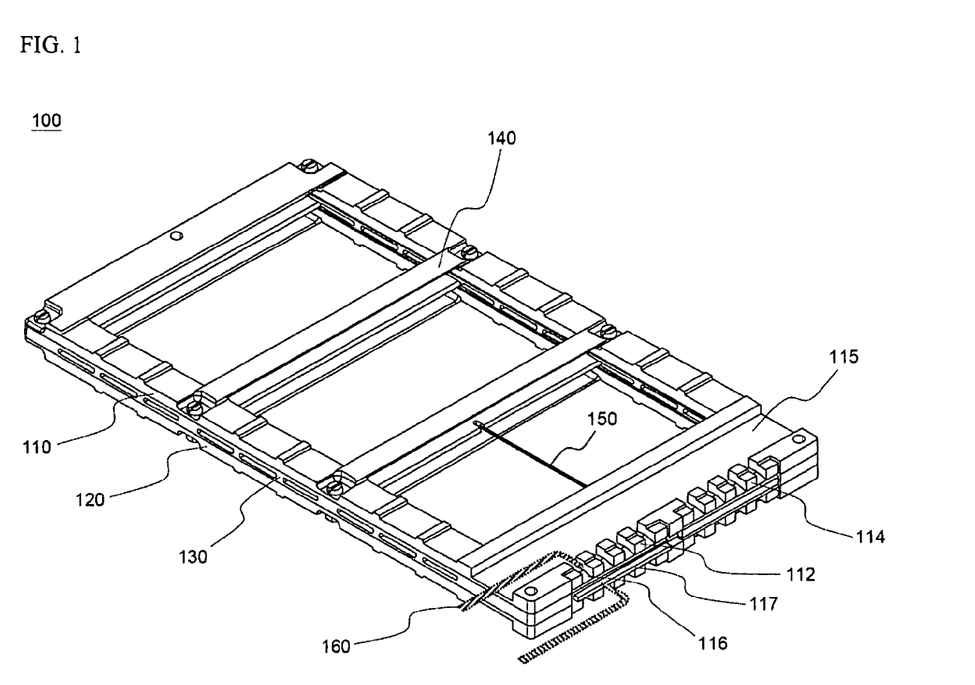
FIG. 1 is a perspective view illustrating a battery cartridge according to a preferred embodiment, which can be used in the present invention.

FIG. 1 is a perspective view typically illustrating a battery cartridge according to a preferred embodiment, which can be used in the present invention.

Referring to FIG. 1, the battery cartridge 100 comprises: a pair of outer frame members 110 and 120; and an inner frame member 130 disposed between the outer frame members 110 and 120. The details of the frame members 110, 120, and 1300 are disclosed in Korean Patent Application No. 2004-111699, which has been filed in the name of the applicant of the present application.

Two unit cells (not shown) are mounted in a hollow part between the first outer frame member 110 and the inner frame member 130 and in another hollow part between the second outer frame member 120 and the inner frame member 130, respectively. The frame members 110, 120, and 130 include pluralities of supporting bars 140, which traverse the hollow parts of the frame members 110, 120, and 130 in the lateral direction of the frame members 110, 120, and 130 for more stably supporting the unit cells between the first outer frame member 110 and the inner frame member 130 and between the second outer frame member 120 and the inner frame member 130.

Figure 2:
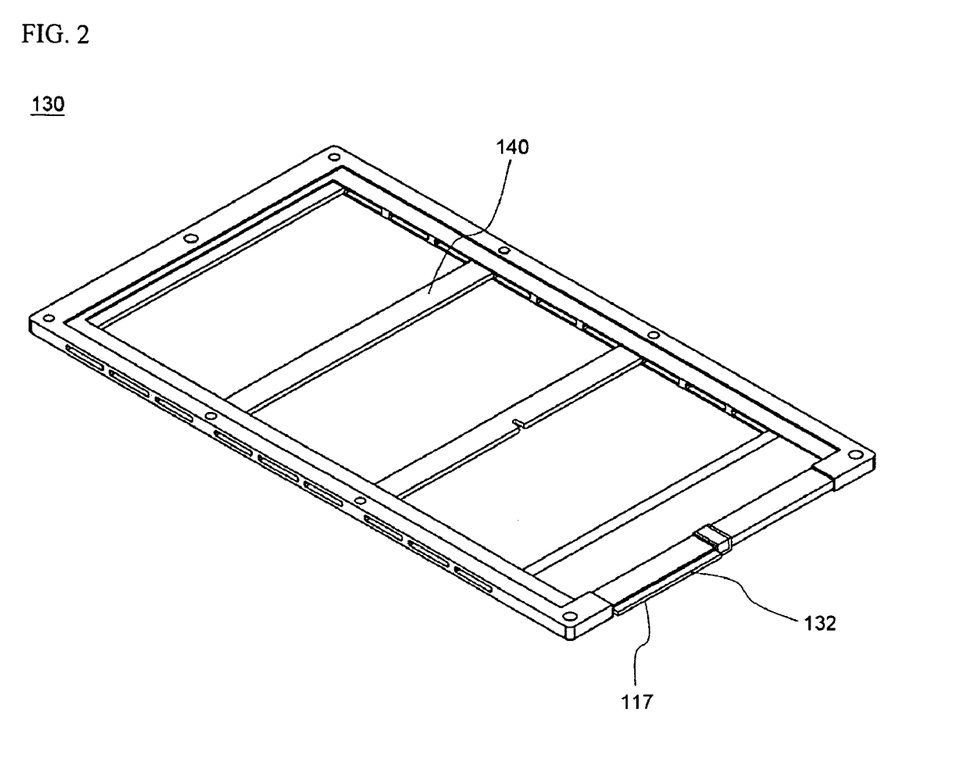
FIG. 2 is a perspective view illustrating an inner frame member used in the battery cartridge shown in FIG. 1.

At the inner frame member 130 is mounted a thermistor 150 for measuring the temperature of the unit cells. The structure of the inner frame member 130 is shown in FIG. 2.

Referring back to FIG. 1, the outer frame members 110 and 120 are provided at the upper ends thereof with locating parts 112 and 114, respectively, at which electrode terminals of the unit cells, which are mounted between the first outer frame member 110 and the inner frame member 130 and between the second outer frame member 120 and the inner frame member 130, are located while being bent. At the outer frame members 110 and 120 under the locating parts 112 and 114 are formed depressions 115, which extend in the lateral direction of the outer frame members 110 and 120. At the locating parts 112 and 114 are also formed pluralities of welding grooves 116, which communicate with the depressions 115. Consequently, when a welding operation, for example, a resistance welding operation is carried out to bus bars (not shown) and electrode terminals (not shown) on the locating parts 112 and 114 during the assembly, one welding tip 160 can be connected to the lower ends of the electrode terminals through the depressions 115 and the welding grooves 116.

A skirt protrudes from one of the locating parts 112 and 114 formed at the upper end of the battery cartridge 110, i.e., the locating part 112. More specifically, as shown in FIG. 2, the skirt 117 protrudes from one side of a locating part 132 formed at the upper end of the inner frame member 130 such that the skirt 117 extends in the lateral direction of the inner frame member 130, which will be described below in detail with reference to FIG. 3.

Figure 3:
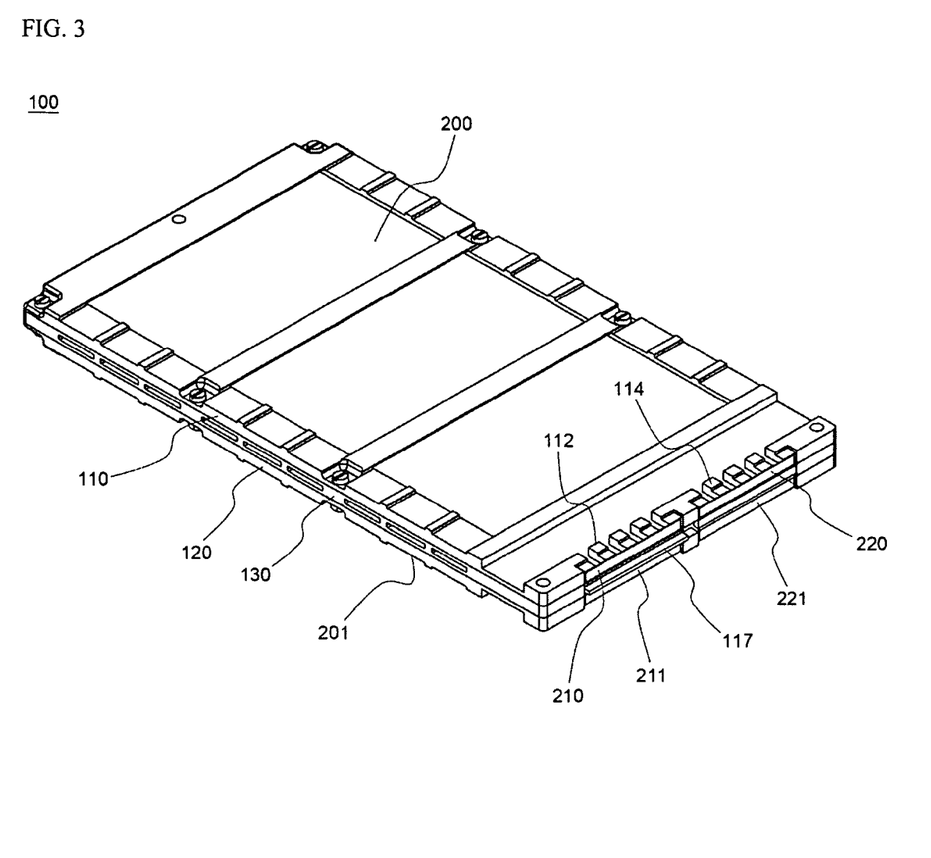
FIG. 3 is a perspective view illustrating two unit cells mounted in the battery cartridge.

FIG. 3 is a perspective view typically illustrating unit cells mounted in the battery cartridge of FIG. 1.

Referring to FIG. 3, electrode terminals 210 and 220 of a unit cell 200, which is mounted between the first outer frame member 110 and the inner frame member 130, and electrode terminals 211 and 221 of another unit cell 201, which is mounted between the second outer frame member 120 and the inner frame member 130 are located at the locating parts 112 and 114, which are formed at the upper end of the battery cartridge, while being bent. Specifically, the electrode terminals 210 and 220 are bent upward while the electrode terminals 221 and 221 are bent downward, as shown in the drawing.

For example, on the assumption that the electrode terminal 210 of the unit cell 200 is the cathode terminal, and the electrode terminal 220 of the unit cell 200 is the anode terminal, the electrode terminal 211 of the unit cell 201 is the anode terminal, and the electrode terminal 221 of the unit cell 201 is the cathode terminal. Consequently, when the two unit cells 200 and 201 are connected in series with each other, the anode terminal 220 of the unit cell 200 and the cathode terminal 221 of the unit cell 201 are electrically connected with each other via a bus bar (not shown), the cathode terminal 210 of the unit cell 200 is connected to the cathode terminal of a unit cell A of a neighboring battery cartridge (not shown), and the anode terminal 211 of the unit cell 201 is connected to the cathode terminal of another unit cell B of the neighboring battery cartridge (not shown).

Consequently, the electrode terminals 220 and 221, which are located at one of the locating parts 112 and 114 of the battery cartridge 100, i.e., the locating part 114, while being bent, are directly connected with each other. On the other hand, the electrode terminals 210 and 211, which are located at the other locating part 112 of the battery cartridge 100 while being bent, are not directly connected with each other but are connected to the electrode terminals of the neighboring battery cartridge. At this time, the skirt 117 disposed on the locating part 112 prevents the electrode terminals 210 and 211, which are bent in opposite directions at the opposite sides of the skirt 117, from being directly connected with each other by the bus bar, whereby the occurrence of short circuit due to the incorrect assembly is prevented.

Figure 4:
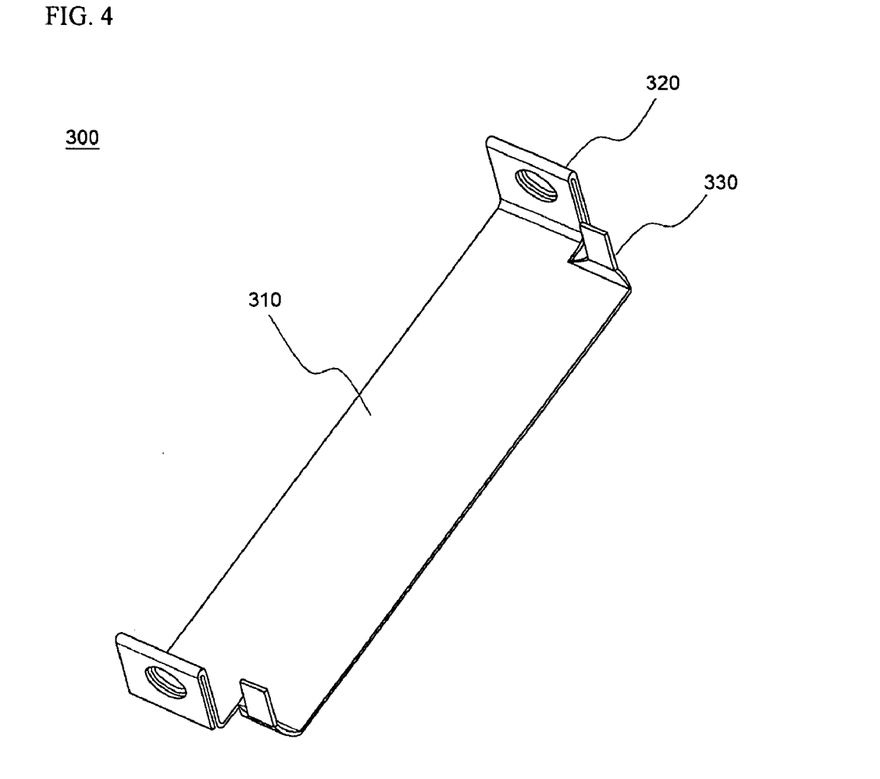
FIG. 4 is a perspective view illustrating a bus bar according to a preferred embodiment, which can be used in the present invention.

FIG. 4 is a perspective view typically illustrating a bus bar according to a preferred embodiment, which can be used in the present invention.

Referring to FIG. 4, the bus bar 300 includes a coupling part 320 and an electrical connection part 330, which are formed at each end of a plate-shaped bar body 310. The lower surface of the plate-shaped bar body 310 is connected to the electrode terminals (see FIG. 3) disposed at the upper end of the battery cartridge, and, afterwards, the electrode terminals are securely attached to the plate-shaped bar body 310 by welding or soldering. The coupling parts 320 and the electrical connection parts 330 are bent in the direction opposite to the surface of the plate-shaped bar body 310 where the electrode terminals are securely attached to the plate-shaped bar body 310.

The structure of the coupling parts 320 and the electrical connection parts 330 will be described in more detail with reference to FIG. 5. The coupling parts 320 are formed by bending the ends of the plate-shaped bar body 310 two times. Specifically, the ends of the plate-shaped bar body 310 are bent upward by 90 degrees, and then the halves of the bent ends of the plate-shaped bar body 310 are bent downward by 180 degrees. Consequently, when the bus bar 300 is mounted to a base plate (not shown), more elastic coupling force is provided by the bus bar, and the bus bar 300 can be more easily inserted into the opening of the base plate by the bent upper end surfaces 321 of the bus bar 300. In the center of each coupling part 320 is formed a coupling groove 322, in which a coupling member (not shown) formed at the opening of the base plate is engaged.

The electrical connection parts 330, which have a length less than that of the coupling parts 320 and which are partially formed at the opposite ends of the plate-shaped bar body 310, protrude upward while having a small width. These protruding connection parts 330 are easily inserted into the corresponding parts of a printed circuit board (PCB), whereby the electrical connection is accomplished.

Figure 6:
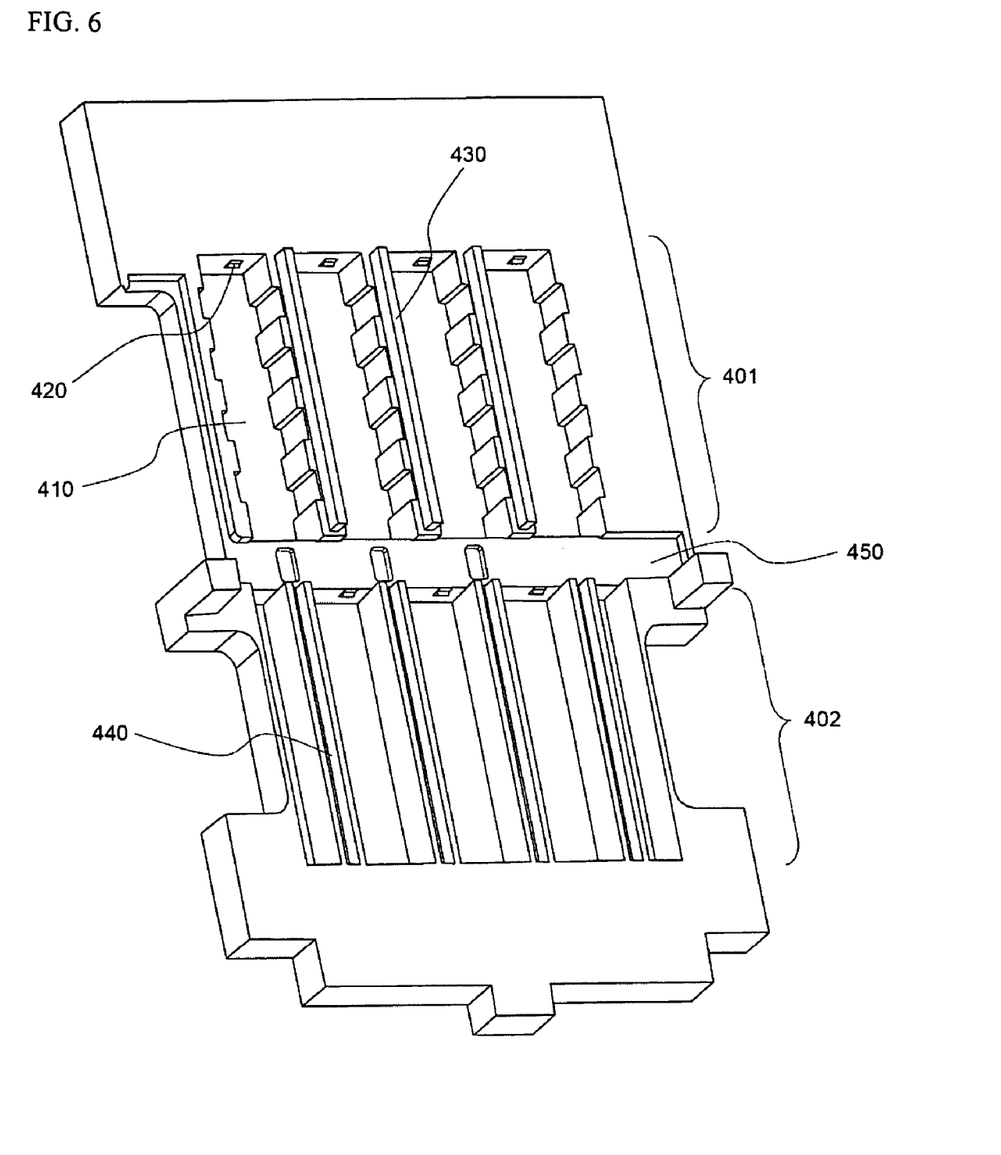
FIG. 6 is a perspective view illustrating a base plate according to a preferred embodiment, which can be used in the present invention.

FIG. 6 is a perspective view typically illustrating a base plate according to a preferred embodiment, which can be used in the present invention.

Referring to FIG. 6, the base plate 400 is a thick plate-shaped member including a plurality of openings 410, in which the bus bars (not shown) are mounted, respectively. The openings 410 are rectangular through-holes having a size corresponding to the bus bars. At the opposite ends of the inside surface of each opening 410 are formed coupling members 420, which are engaged in the coupling grooves 322 formed at the coupling parts 320 of the bus bar (see FIG. 5).

The openings 410 of the base plate 400 are classified into an upper opening array 401, in which bus bars interconnecting one-side electrode terminals of stacked battery cartridges are mounted, and a lower opening array 402, in which bus bars interconnecting the other-side electrode terminals of the stacked battery cartridges are mounted. The openings of the upper opening array 401 and the openings of the lower opening array 402 are alternately arranged because of the connecting positions of the bus bars when the electrode terminals are electrically connected with each other, as previously described with reference to FIG. 3. Also, skirts 430 are formed on the partitions between the openings of the upper opening array 401, and grooves 440 are formed on the partitions between the openings of the lower opening array 402. The skirt 117 disposed on the locating part 112 formed at the upper end of the battery cartridge 100 (see FIG. 3) is engaged in the corresponding groove 440 of the lower opening array 402.

Between the upper opening array 401 and the lower opening array 402 is disposed a bridge 450, which is depressed such that a printed circuit board (PCB) (not shown) is located on the bridge 450. On a portion of the bridge is formed a plurality of grooves, in which the connectors of thermistors (not shown) are located.

Figure 7:
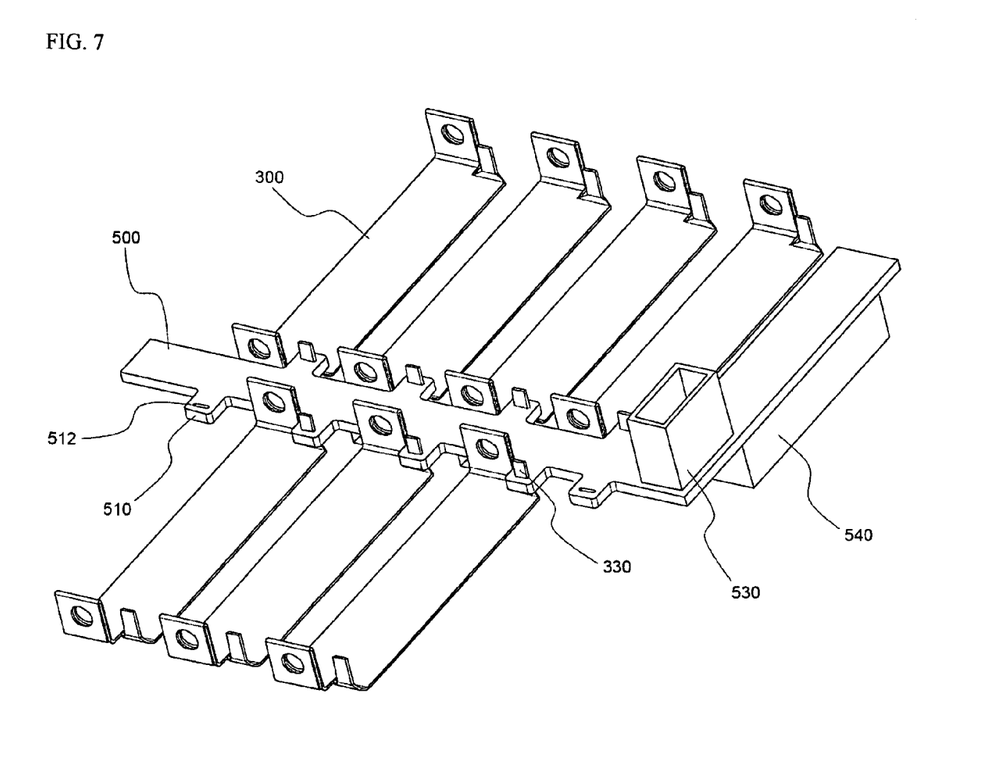
FIG. 7 is a perspective view illustrating a printed circuit board (PCB) according to a preferred embodiment, which can be used in the present invention, with a plurality of bus bars being connected to the printed circuit board (PCB)

FIG. 7 is a perspective view typically illustrating a printed circuit board (PCB) according to a preferred embodiment, which can be used in the present invention, with a plurality of bus bars being connected to the printed circuit board (PCB).

Referring to FIG. 7, the printed circuit board (PCB) 500 is a plate-shaped member. The printed circuit board (PCB) 500 has protrusions 510 formed at predetermined positions where the bus bars 300 are connected to the printed circuit board (PCB) 500. In each protrusion 510 is formed a connection hole 512, through which the connection part 330 of the corresponding bus bar 300 is inserted. Consequently, the connection between the bus bars 300 and the printed circuit board (PCB) 500 is accomplished by simply inserting the connection parts 300 through the connection holes 512. This connection is stably maintained even when the external forces, for example, impacts or vibrations, are applied to the assembly of the printed circuit board (PCB) 500 and the bus bars 300. The mechanical and electrical coupling degree at the connected parts of the assembly of the printed circuit board (PCB) 500 and the bus bars 300 may be increased by soldering. Information, such as voltage, of the unit cells (not shown) is transmitted to a circuit of the printed circuit board (PCB) 500 through the connection parts 330 of the bus bars 300, and is then transmitted to a battery management system (BMS) (not shown), where the unit cells are controlled based on the information transmitted to the battery management system (BMS).

The printed circuit board (PCB) 500 is provided at the front and rear surfaces thereof with connectors 530 and 540 for electrical connection with the battery management system (BMS). For example, the connector 530 may be a connector, to which a communication cable between a slave battery management system (BMS) and a master battery management system (BMS) is connected, and the connector 540 may be a connector, through which voltage and temperature signals are transmitted to the slave battery management system (BMS). The positions of the connectors 530 and 540 may be reversed. According to circumstances, at least one of the connectors 530 and 540 may be removed. Consequently, the electrical connection between the printed circuit board (PCB) 500 and the battery management system (BMS) can be accomplished in various constructions. These constructions must be interpreted to fall within the scope of the present invention.

Figure 5:
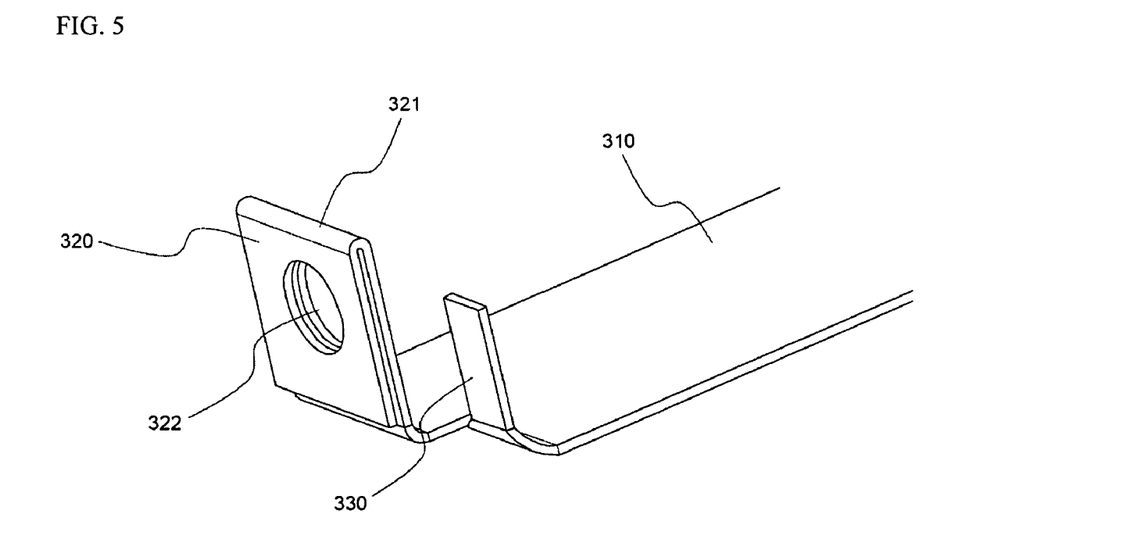
FIG. 5 is a partially enlarged view of the bus bar shown in FIG. 4.
Figure 8:
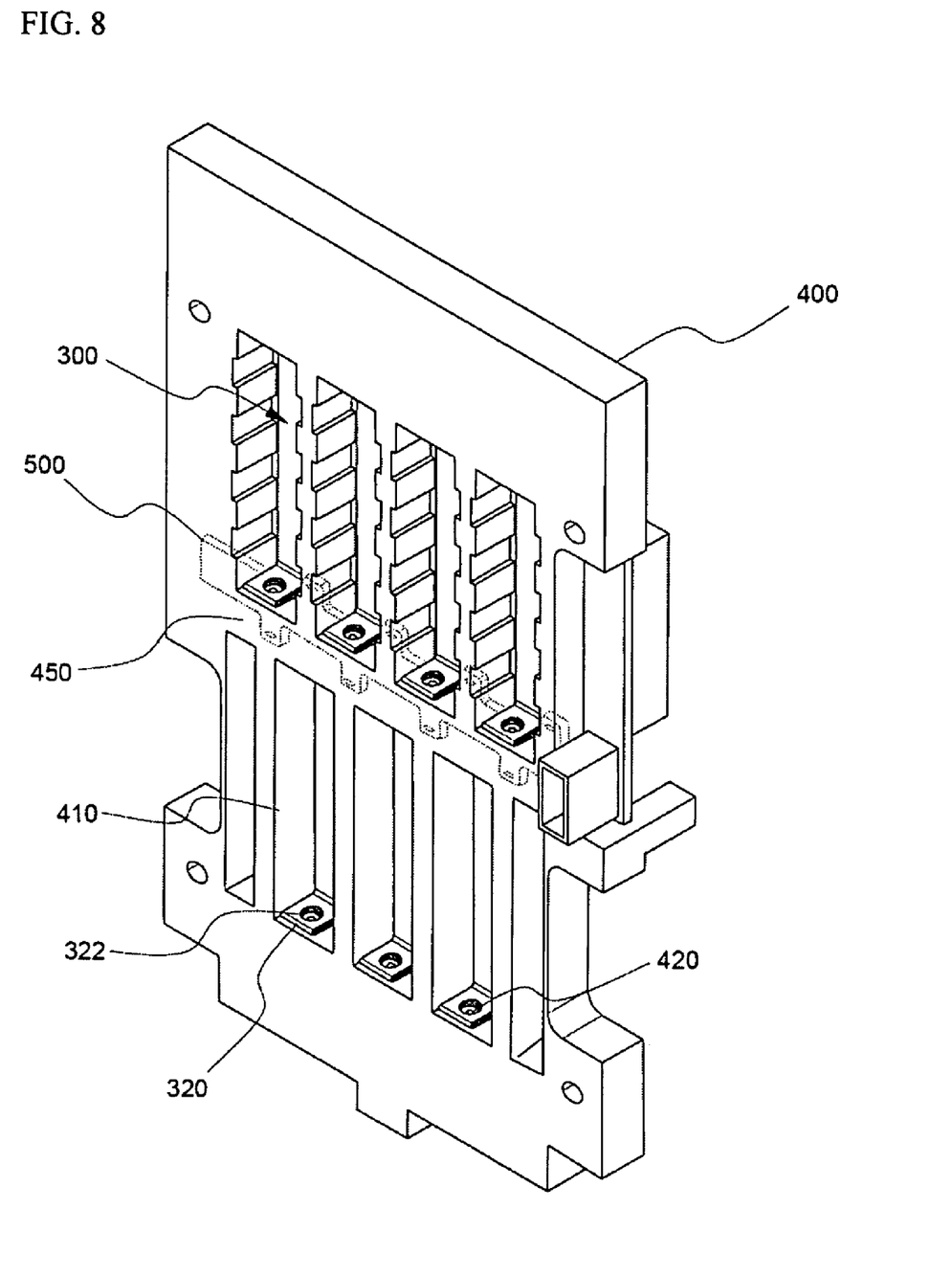
FIG. 8 is a perspective view illustrating the front surface of the base plate with the bus bars and the printed circuit board (PCB) being mounted to the base plate of FIG. 5.
Figure 9:
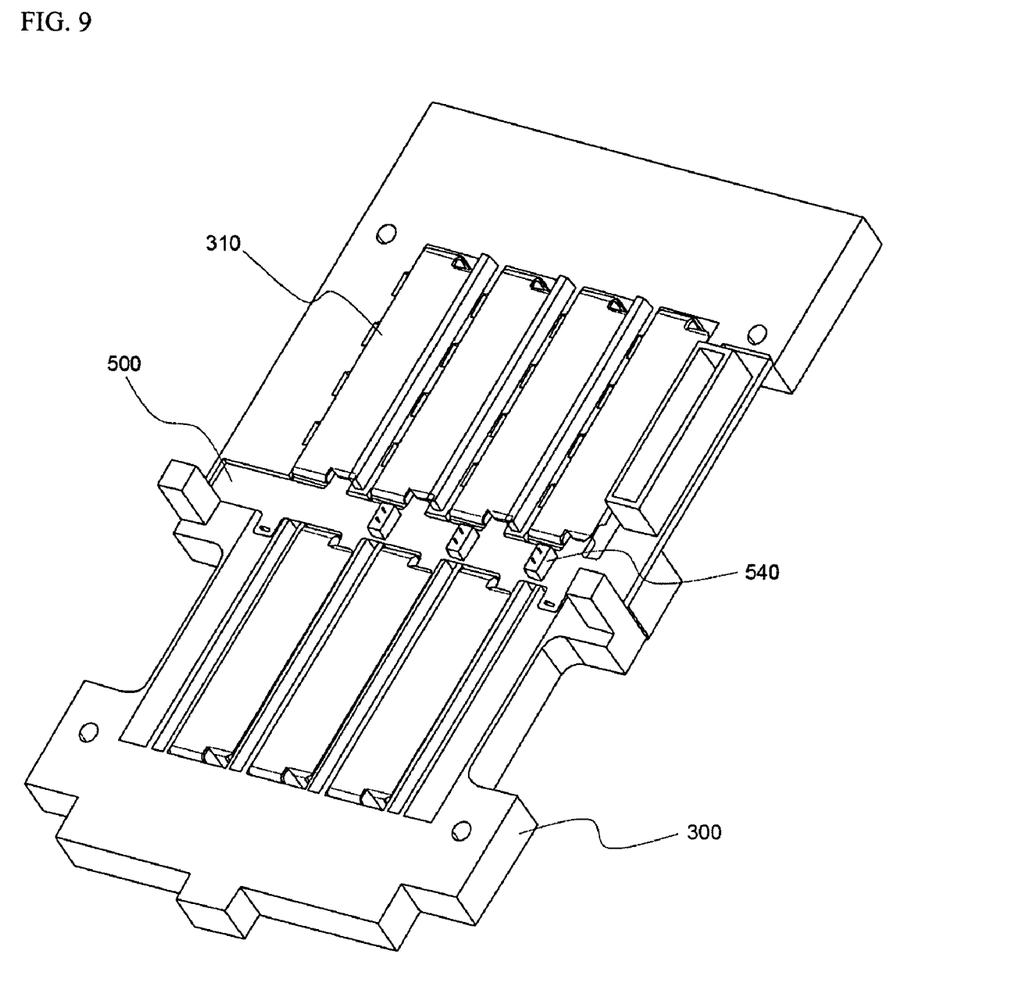
FIG. 9 is a perspective view illustrating the rear surface of the base plate shown in FIG. 8.

FIGS. 8 and 9 are typical perspective views respectively illustrating the front and rear surfaces of the base plate with the bus bars and the printed circuit board (PCB) of FIG. 6 being mounted to the base plate of FIG. 5.

Referring to FIGS. 8 and 9, the coupling members 420 of the base plate 400 are engaged into the coupling grooves 322 of the bus bars 300, whereby the bus bars 300 are mounted to the base plate 400. In the state that the bus bars 300 are mounted to the base plate 400, the coupling parts 320 of the bus bars 300 are exposed from the front surface (or the outer surface) of the base plate 400 through the openings 410, and the plate-shaped bar bodies 310 of the bus bars 300 are exposed from the rear surface (or the inner surface) of the base plate 400. The electrode terminals of the battery cartridges 100 (see FIG. 3) are connected to the rear surfaces of the plate-shaped bar bodies 310 of the bus bars 300. It is preferable that the electrode terminals of the battery cartridges 100 are securely attached to the plate-shaped bar bodies 310 of the bus bars 300 by laser welding or resistance welding. Because of the elastic engagement between the coupling members 420 of the base plate 400 and the coupling grooves 322 of the bus bars 300, the plate-shaped bar bodies 310 of the bus bars 300 are connected to the electrode terminals of the battery cartridges in a somewhat pressurized state when a battery module (not shown) having a plurality of battery cartridges mounted therein is coupled to the base plate 400, whereby conditions preferable to perform the welding or the soldering are formed.

The printed circuit board (PCB) 500 is attached to the rear surface of the base plate 400 (The printed circuit board 500 is indicated by a dotted line in FIG. 8) such that the printed circuit board (PCB) 500 is located on the bridge 450 of the base plate 400. The connectors 540, which are connected to the thermistors 150 (see FIG. 1), are formed at the printed circuit board (PCB) 500.

As described above in detail with reference to FIGS. 1 to 9, the assembly can be easily carried out in a specific structure by using the battery cartridge-connecting system according to the present invention. Furthermore, the mechanical and electrical coupling is excellent in the assembled state, and therefore, the coupling is stably maintained even when the external forces, for example, impacts or vibrations, are applied to the assembly.

Figure 10:
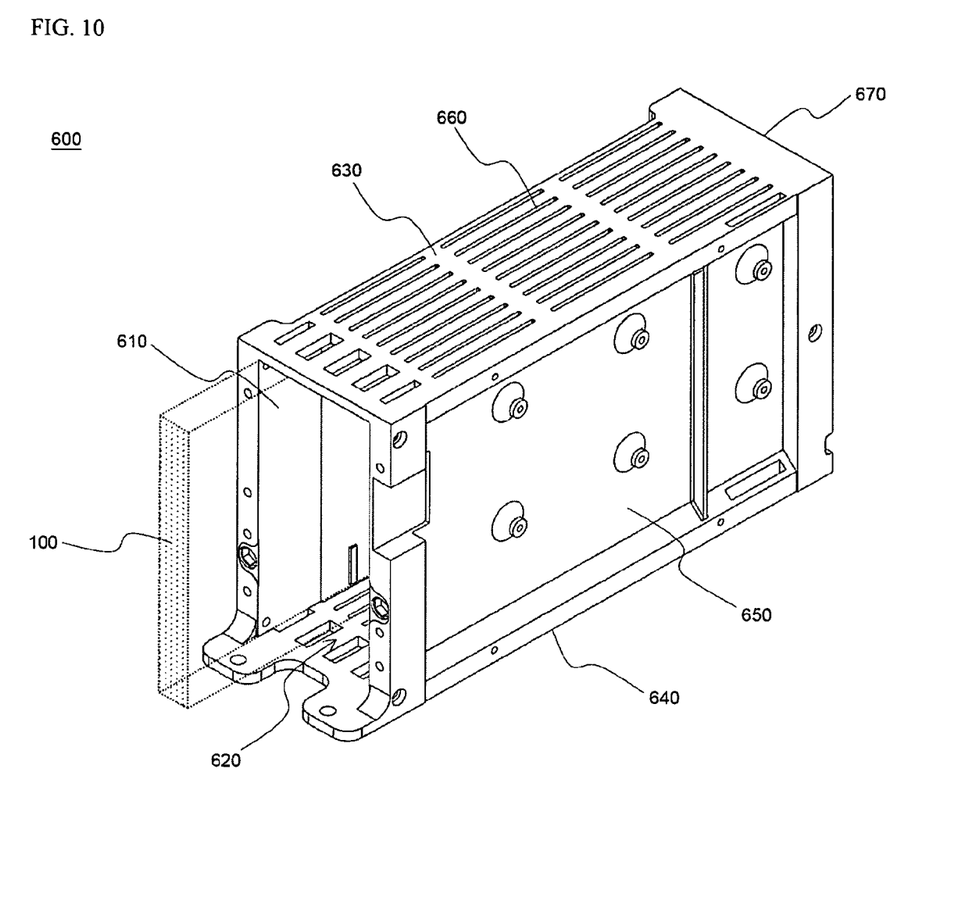
FIG. 10 is a perspective view illustrating a box-shaped module case, which is used to manufacture a battery module according to a preferred embodiment of the present invention.
Figure 11:
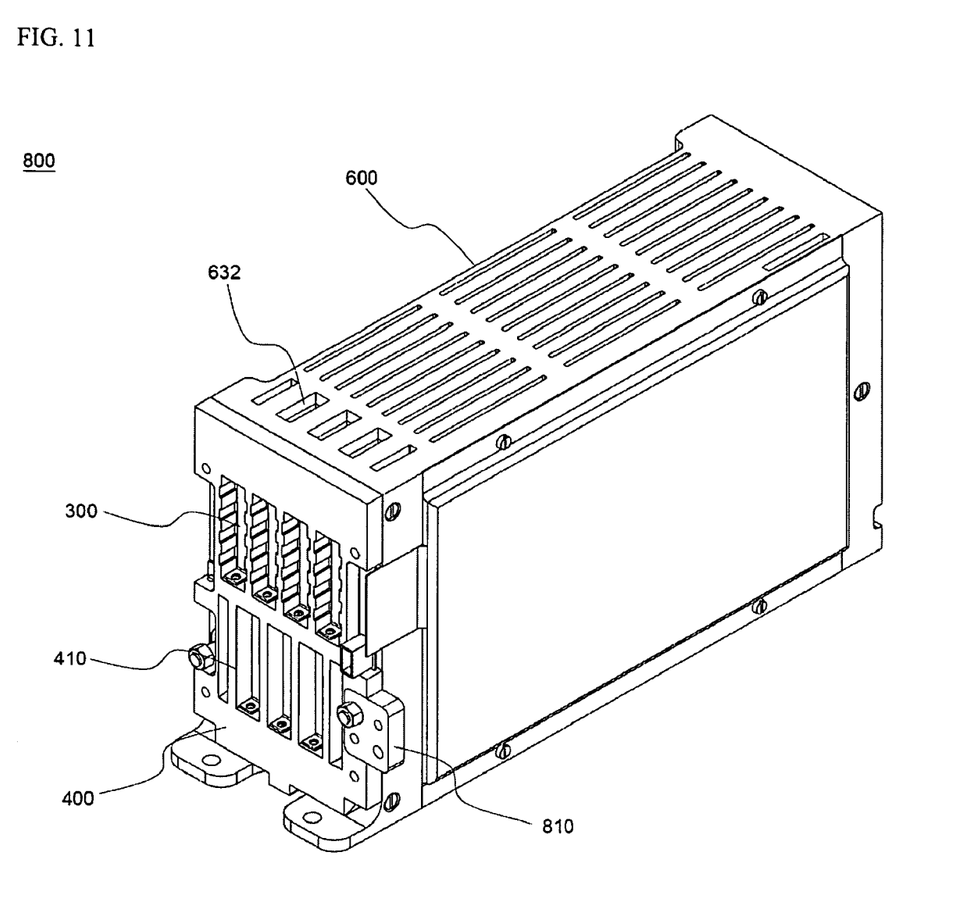
FIG. 11 is a perspective view illustrating a battery module according to a preferred embodiment of the present invention.

FIG. 10 is a perspective view typically illustrating a box-shaped module case, which is used to manufacture a battery module according to a preferred embodiment of the present invention, and FIG. 11 is a perspective view typically illustrating a battery module according to a preferred embodiment of the present invention.

Referring to FIGS. 10 and 11, the module case 600 has an open front part 610 and an inner space 620, in which a plurality of battery cartridges 100 are mounted. The module case 600 is formed approximately in the shape of a box. The module case 600 is provided at the upper end 630 thereof with a plurality of through-channels 660. Also, the module case 600 is provided at the lower end 640 thereof with a plurality of through-channels 660. The through-channels 660 formed at the upper and lower ends 630 and 640 of the module case 600 communicate with the inner space 620 of the module case 600. According to circumstances, the through-channels 660 may be further formed at the rear surface 670 of the module case 600. To the side surface 650 of the module case 600 is attached a battery management system (not shown).

The base plate 400, to which the bus bars 300 and the printed circuit board (PCB) (not shown) are attached, is mounted at the open front part 610 of the module case 600 while the plurality of battery cartridges 100 are mounted in the module case 600, and then the base plate 400 is securely assembled to the module case 600 by means of bolts and nuts.

After the assembly is completed, welding tips (not shown) are introduced through introduction holes 632 formed at the upper end 630 of the module case 600 to carry out the resistance welding of the bus bars 300 and the electrode terminals. When the resistance welding is carried out, other welding tips (not shown) are connected to the outer surfaces of the bus bars 300 exposed through the openings 410 of the base plate 400. According to circumstances, it is possible to directly carry out laser welding to the bus bars 300 exposed through the openings 410 of the base plate 400. Since the introduction holes 632, through which the welding tips are introduced, communicate with the depression 115 of the battery cartridge 100, which is shown in FIG. 1, the welding tips can be easily connected to the rear surfaces of the electrode terminals through the depression 115 and the welding grooves 116, as described with reference to FIG. 1.

Figure 12:
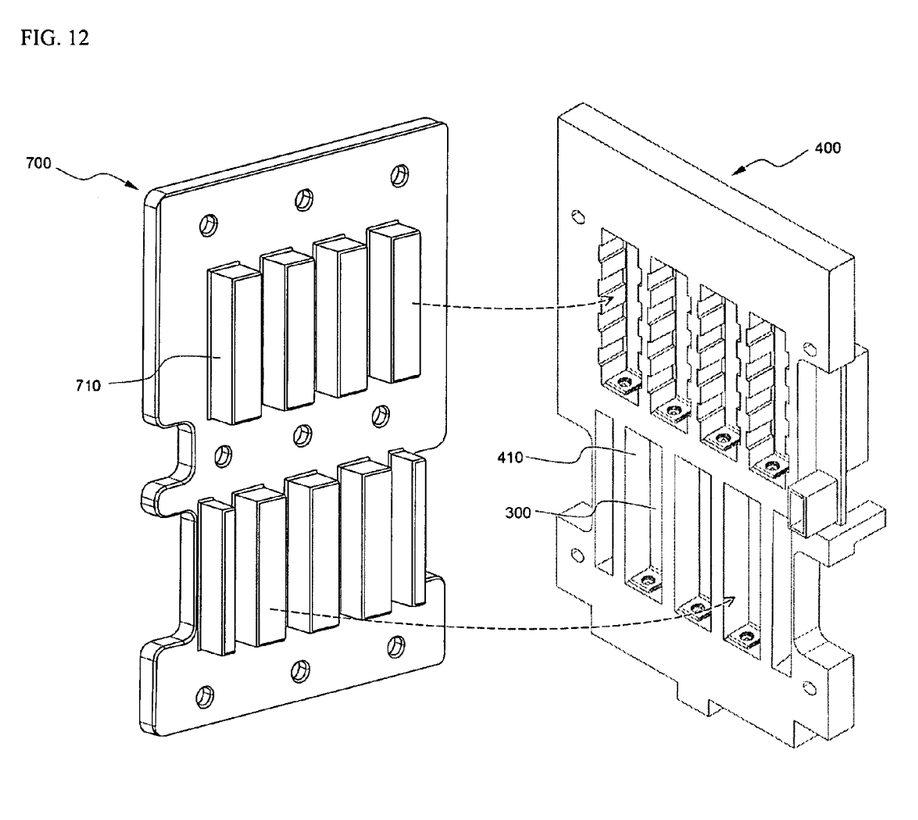
FIG. 12 is a perspective view illustrating a safety plate according to a preferred embodiment, which can be mounted in a battery module according to the present invention.

According to circumstances, as shown in FIG. 12, a safety plate may be attached to the outer surface of the base plate 400.

Referring to FIG. 12, the safety plate 700 is formed in a shape similar to the base plate 400, and the safety plate 700 includes a plurality of inserting parts 710, which have a size and a shape suitable to be inserted into the openings 410 of the base plate 400. As shown in the drawing, the inserting parts 710 are inserted into the openings 410 of the base plate 400, whereby the tight contact between the bus bars 300 and the battery cartridges (not shown) is improved, the separation of the bus bars 300 is prevented when external impacts are applied to the battery module, and the possibility of short circuits, which may be caused due to the exposure of the bus bars 300, is prevented.

Referring back to FIG. 11, a battery module 800 is completed through the above-described assembly process. The battery module 800 generally has a compact size, and therefore, the battery module 800 provides high output for each unit volume. Furthermore, the battery module 800 provides high mechanical and electrical safety against external impacts.

A plurality of battery modules 800 having the above-described construction, are electrically connected with each other to manufacture a high-output, large-capacity battery system. In this case, the electrical connection between the battery modules 800 is accomplished by a connecting member 810 coupled to one side of the base plate 400. This battery system is very useful as a power source for electric vehicles, especially, hybrid electric vehicles.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the battery cartridge-connecting system according to the present invention easily accomplishes the electrical connection and the mechanical coupling in the compact-structured battery module or battery system. In addition, the battery cartridge-connection system has excellent electrical characteristics, such as electric resistance at the connected parts, after the electrical connection is completed, and excellent mechanical strength to external impacts or vibrations after the mechanical coupling is completed. Furthermore, the battery cartridge-connecting system prevents a risk of an engineer or a user being exposed to the electrical short circuits when the battery module or the battery system is manufactured or when the battery module or the battery system is repaired.

What is claimed is:

1. A battery cartridge-connecting system for battery modules, comprising:

bus bars, which are members for electrically connecting battery cartridges, each of the bus bars including a plate-shaped bar body constructed to be in surface contact with electrode terminals of a battery, a coupling part formed by bending at least a portion of each end of the plate-shaped bar body, and an electrical connection part formed by bending at least a portion of each end of the plate-shaped bar body, wherein each of the coupling parts is provided with a coupling groove, in which a corresponding coupling member formed at a base plate is engaged, and the electrical connection parts are formed in the shape of a protrusion, which can be securely inserted into a corresponding part of a printed circuit board (PCB);

the base plate, which is a member for allowing the plurality of bus bars to be attached thereto, the base plate including a plurality of openings, into which the bus bars are securely inserted, the coupling members being formed at the openings such that the coupling members are engaged in the coupling grooves of the bus bars; and the printed circuit board (PCB), which is a member electrically connected to the plurality of bus bars, the printed circuit board (PCB) having connection holes, through which the protruding electrical connection parts of the bus bars are securely inserted, wherein the connection holes of the printed circuit board (PCB) are formed through protrusions formed at sides of the printed circuit board (PCB).

2. The battery cartridge-connecting system according to claim 1, wherein each of the battery cartridges includes a pair of outer frame members and an inner frame member disposed between the outer frame members such that a unit cell is mounted between the first outer frame member and the inner frame member and another unit cell is mounted between the second outer frame member and the inner frame member or such that two or more unit cells are mounted between one of the outer frame members and the inner frame member.

3. The battery cartridge-connecting system according to claim 2, wherein the inner frame member is provided at a predetermined position corresponding to one of the electrode terminals (the cathode terminal or the anode terminal) of the upper end thereof with a skirt, which extends along the corresponding electrode terminal, and the base plate is provided at a predetermined position corresponding to the skirt with a groove, in which the skirt is engaged.

4. The battery cartridge-connecting system according to claim 2, wherein the electrode terminals of the unit cells mounted in the battery cartridges and the bus bars mounted to the base plate are securely attached to each other by welding or soldering after the assembly of the battery cartridges and the base plate is completed, whereby the coupling and the electrical connection between the electrode terminals and the bus bars are more securely accomplished.

5. The battery cartridge-connecting system according to claim 4, wherein the electrode terminals and the bus bars are welded to each other.

6. The battery cartridge-connecting system according to claim 2, wherein the outer frame members are provided at the upper ends thereof with locating parts, at which the electrode terminals of the unit cells are located while being bent, and wherein the outer frame members are provided under the locating parts thereof with depressions, which extend in the lateral direction of the outer frame members, and the locating parts have pluralities of welding grooves, which communicate with the depressions, whereby the welding operation is easily carried out.

7. The battery cartridge-connecting system according to claim 2, wherein each of the battery cartridges further has a thermistor for measuring the temperature of the unit cells.

8. The battery cartridge-connecting system according to claim 7, wherein the thermistor is mounted between the unit cells through a groove formed between the anode terminal locating part and the cathode terminal locating part of the inner frame member.

9. The battery cartridge-connecting system according to claim 2, wherein each of the unit cells is a pouch-shaped lithium-ion cell or a pouch-shaped lithium-ion polymer cell.

10. The battery cartridge-connecting system according to claim 1, wherein the coupling parts are bent two times or more such that the coupling parts are elastically engaged in the openings of the base plate with ease when the bus bars are mounted in the openings of the base plate.

11. The battery cartridge-connecting system according to claim 1, wherein the bending direction of the coupling parts is identical to that of the electrical connection parts, and the width of the coupling parts is greater than that of the electrical connection parts, whereby the coupling force between the bus bars and the openings of the base plate is provided by the coupling parts when the bus bars are mounted in the openings of the base plate.

12. The battery cartridge-connecting system according to claim 1, wherein the base plate is attached to the upper ends of the plurality of battery cartridges, which are stacked, and the base plate includes openings (an upper opening array), in which bus bars interconnecting one-side electrode terminals of the stacked battery cartridges are mounted, and openings (a lower opening array), in which bus bars interconnecting the other-side electrode terminals of the stacked battery cartridges are mounted, the openings of the upper opening array and the openings of the lower opening array being alternately arranged.

13. The battery cartridge-connecting system according to claim 12, wherein one of the opening arrays is provided with grooves, in which the skirts of the battery cartridges are engaged, and the other opening array is provided with corresponding skirts.

14. The battery cartridge-connecting system according to claim 1, wherein the electrical connection parts of the bus bars are inserted through the connection holes of the printed circuit board (PCB), and then the electrical connection parts are securely attached to the printed circuit board (PCB) by soldering.

15. A battery module including a battery cartridge-connecting system according to claim 1.

16. The battery module according to claim 15, wherein the battery module comprises:
   a battery cartridge assembly including two or more battery cartridges;
   a box-shaped module case having an open front part, through which the battery cartridge assembly is inserted, and an inner space, in which the battery cartridge assembly is mounted; and
   a battery cartridge-connecting system coupled to the front open part of the case.

17. The battery module according to claim 16, wherein the plurality of battery cartridges are inserted into the module case, the battery cartridge-connecting system is coupled to the open front part of the module case, and the electrode terminals of the battery cartridges and bus bars are securely attached to each other by welding.

18. The battery module according to claim 15, further comprising:
   a safety plate for covering the outer surface of the base plate, the safety plate having a plurality of inserting parts, which have a size and a shape suitable to be inserted into the openings of the base plate.

19. A high-output, large-capacity battery system including a plurality of battery modules according to claim 15 electrically connected with each other.

20. The battery system according to claim 19, wherein the battery system is used for electric vehicles or hybrid electric vehicles.

* * * * *